(12) United States Patent
Schinckel et al.

(10) Patent No.: US 11,219,192 B2
(45) Date of Patent: Jan. 11, 2022

(54) SYSTEMS AND METHODS FOR COOLING AN ANIMAL

(71) Applicant: Purdue Research Foundation, West Lafayette, IN (US)

(72) Inventors: Allan P. Schinckel, West Lafayette, IN (US); Robert Merton Stwalley, III, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 352 days.

(21) Appl. No.: 16/060,702

(22) PCT Filed: Dec. 15, 2016

(86) PCT No.: PCT/US2016/066893
§ 371 (c)(1),
(2) Date: Jun. 8, 2018

(87) PCT Pub. No.: WO2017/106475
PCT Pub. Date: Jun. 22, 2017

(65) Prior Publication Data
US 2019/0045739 A1    Feb. 14, 2019

Related U.S. Application Data

(60) Provisional application No. 62/347,161, filed on Jun. 8, 2016, provisional application No. 62/268,066, filed on Dec. 16, 2015.

(51) Int. Cl.
*A01K 1/015*    (2006.01)
(52) U.S. Cl.
CPC ................. *A01K 1/0158* (2013.01)

(58) Field of Classification Search
CPC ............................. A01K 1/015; A01K 1/0158
See application file for complete search history.

(56) References Cited

U.S. PATENT DOCUMENTS 271,991 A * 2/1883 Rosebrook ........... A01K 1/0158
236/3
1,189,400 A * 7/1916 Smith .................. A01K 1/0158
236/3
(Continued)

FOREIGN PATENT DOCUMENTS

EP    1481585    12/2004
FR    2695294    3/1994
(Continued)

OTHER PUBLICATIONS

Translation of JP3127810U (Year: 2006).*
Supplemental European Search Report, for European Application No. EP 16 87 6667, dated Jun. 14, 2019, (8 pgs).

*Primary Examiner* — Magdalena Topolski
*Assistant Examiner* — Morgan T Barlow
(74) *Attorney, Agent, or Firm* — Hartman Global IP Law; Gary M. Hartman; Domenica N. S. Hartman

(57) ABSTRACT

Systems and methods that include a metallic panel having an upper surface for contacting an animal and a lower surface, at least one metallic cooling element thermally contacting the lower surface of the metallic panel and having an internal passage therein, and a coolant supply that flows a coolant through the internal passage of the cooling element. Flow of the coolant through the cooling element reduces the temperature of the upper surface of the metallic panel and thereby reduces the body temperature of the animal when the animal is in contact with the metallic panel.

10 Claims, 19 Drawing Sheets

(56) References Cited

U.S. PATENT DOCUMENTS

| | | | |
|---|---|---|---|
| 1,746,235 A * | 2/1930 | Barker | F24D 3/14 165/56 |
| 1,962,909 A * | 6/1934 | Price | F28D 7/1661 165/76 |
| 2,110,660 A * | 3/1938 | Doczekal | F24D 13/024 392/436 |
| 2,469,963 A * | 5/1949 | Grosjean | F24D 3/14 165/56 |
| 2,598,279 A * | 5/1952 | Mckibbin | F24D 3/14 165/56 |
| 2,617,005 A * | 11/1952 | Jorgensen | H05B 3/683 219/508 |
| 2,646,971 A * | 7/1953 | Raskin | F28D 1/0477 165/134.1 |
| 2,661,718 A * | 12/1953 | Ruport | A01K 1/0158 119/483 |
| 2,961,524 A * | 11/1960 | Newman | A01K 1/0158 219/536 |
| 2,963,565 A | 12/1960 | Moore et al. | |
| 3,041,441 A * | 6/1962 | Elbert | A01K 1/0158 392/435 |
| 3,809,014 A * | 5/1974 | Jones | A01K 1/0158 119/508 |
| 3,826,230 A * | 7/1974 | Jones | A01K 1/0158 119/508 |
| 4,018,271 A * | 4/1977 | Jones | A01K 1/0158 165/175 |
| 4,064,835 A * | 12/1977 | Rabenbauer | A01K 1/0353 119/28.5 |
| 4,252,082 A * | 2/1981 | Herring | A01K 1/0158 119/508 |
| 4,294,195 A * | 10/1981 | Rodenberg | A01K 1/0218 119/509 |
| 5,448,788 A * | 9/1995 | Wu | A47C 21/048 5/421 |
| 5,871,151 A | 2/1999 | Fiedrich | |
| 5,931,381 A * | 8/1999 | Fiedrich | F24F 5/0089 237/69 |
| 5,937,793 A * | 8/1999 | Church | A01K 1/0151 119/528 |
| 5,966,502 A * | 10/1999 | Pearce | F28F 3/12 165/169 |
| 5,967,085 A * | 10/1999 | Kawamura | A01K 63/04 119/215 |
| 6,516,624 B1 * | 2/2003 | Ichigaya | A41D 13/0056 62/259.3 |
| 6,708,646 B1 * | 3/2004 | Wang | A01K 1/0158 119/28.5 |
| 6,943,320 B1 * | 9/2005 | Bavett | H05B 3/34 219/213 |
| 7,913,648 B2 * | 3/2011 | Maeda | A01K 7/027 119/61.52 |
| 8,011,204 B2 * | 9/2011 | Kissel, Jr. | A01K 1/034 62/434 |
| 8,291,866 B2 * | 10/2012 | Cauchy | A01K 1/0236 119/500 |
| 8,397,677 B2 * | 3/2013 | Bruer | A01K 1/0158 119/448 |
| 9,398,722 B1 * | 7/2016 | Sykes | F25B 13/00 |
| 9,497,928 B2 * | 11/2016 | Garner | A01K 29/005 |
| 9,706,748 B2 * | 7/2017 | Choi | A01K 1/0158 |
| 2003/0229385 A1 * | 12/2003 | Elkins | A61F 7/0085 607/104 |
| 2005/0039699 A1 * | 2/2005 | Sato | A61B 5/0816 119/712 |
| 2005/0160994 A1 * | 7/2005 | Pollock | A01K 39/0213 119/72 |
| 2006/0144578 A1 * | 7/2006 | Fiedrich | F24D 3/142 165/168 |
| 2008/0022935 A1 * | 1/2008 | Fine | A01K 1/0353 119/28.5 |
| 2008/0173627 A1 * | 7/2008 | Martin | A01K 1/0272 219/201 |
| 2008/0216496 A1 * | 9/2008 | Kissel | A01K 1/0353 62/132 |
| 2010/0012039 A1 * | 1/2010 | Hallstrom | A01K 1/12 119/14.02 |
| 2010/0095641 A1 * | 4/2010 | Ruetenik | A01L 15/00 54/82 |
| 2011/0269388 A1 * | 11/2011 | Meulenbelt | F24F 5/0035 454/76 |
| 2011/0283952 A1 * | 11/2011 | Bruer | A01K 1/0158 119/448 |
| 2012/0167607 A1 * | 7/2012 | Callender | A61F 7/10 62/259.3 |
| 2012/0199080 A1 * | 8/2012 | Siddons | A01K 1/033 119/448 |
| 2012/0234247 A1 * | 9/2012 | Graves | A01K 1/0158 119/28.5 |
| 2013/0312667 A1 * | 11/2013 | Fisher | A01K 1/0107 119/165 |
| 2014/0374056 A1 | 12/2014 | Choi | |
| 2015/0047805 A1 * | 2/2015 | Gregory | E04F 13/148 165/53 |
| 2015/0276232 A1 * | 10/2015 | Wei | F24D 3/18 237/69 |
| 2015/0316278 A1 * | 11/2015 | Chi | F25B 41/046 62/160 |
| 2016/0025356 A1 * | 1/2016 | Obrist | F24F 11/83 165/218 |
| 2016/0113239 A1 * | 4/2016 | Hagemeier | A01K 1/0353 119/28.5 |
| 2016/0227726 A1 * | 8/2016 | Priest | F04D 25/166 |
| 2016/0316711 A1 * | 11/2016 | Davis | A01K 1/0245 |
| 2018/0059690 A1 * | 3/2018 | Coleman | F28F 21/065 |
| 2019/0313599 A1 * | 10/2019 | Snell | A01K 1/0209 |

FOREIGN PATENT DOCUMENTS

| | | | | |
|---|---|---|---|---|
| GB | 271644 | A * | 6/1927 | F24D 3/14 |
| GB | 289927 | A * | 4/1928 | F24D 3/148 |
| GB | 321450 | A * | 11/1929 | F24D 3/14 |
| GB | 463071 | A * | 3/1937 | F24D 3/14 |
| GB | 730939 | A * | 6/1955 | F24D 3/165 |
| JP | 3127810 | | 12/2006 | |

\* cited by examiner

SYSTEMS AND METHODS FOR COOLING AN ANIMAL

CROSS REFERENCE TO RELATED APPLICATIONS

This application claims the benefit of International Application No. PCT/US2016/066893 filed Dec. 15, 2016, having a claim of priority to US Provisional Patent Application Nos. 62/268,066, filed Dec. 16, 2015 and 62/347,161, filed Jun. 8, 2016.

BACKGROUND OF THE INVENTION

The present invention generally relates to systems and methods for cooling animals to promote well-being and reproductive performance. The invention particularly relates to a system comprising a cooling pad configured to actively cool an animal relative to the ambient environmental temperatures to which the animal is exposed.

Modern hog farrowing operations have reached a state in which the ambient environmental conditions preferred for piglets are usually significantly different from that preferred for the sow. Selection for increased litter size and lean growth has led to the selection of piglets with decreased birth weights and less body energy reserves at birth. In order to promote survival rates of the piglets, ambient environmental (room) temperatures greater than 25° C. and a floor lying area temperature of about 37° C. provided by heat pads or heat lamps is currently recommended for farrowing barns. Therefore, in most swine producing areas, the farrowing rooms are maintained at about 25° C. for about nine months of the year, and the barns are often still warmer during summer months.

However, sows have an increased susceptibility to heat stress, if the ambient temperature in the farrowing room rises above 25° C. Recently, greater than 60% of sow farm operations in the U.S.A. reported a decline in fertility during the warmest summer months of July and August. Moreover, daily feed intakes, milk production levels, and subsequent reproductive performance of sows are negatively impacted as a result of maintaining farrowing room temperatures of 25° C. to promote piglet survival. This issue has been worsened by increases in litter size and milk production which have increased the heat production of lactating sows by 55% to 70% and reduced their upper critical temperature to approximately 18° C.

If the anticipated ambient environmental temperatures continue to be increased, it will become increasingly more important for lactating sows to be provided with some form of active cooling to maintain their productivity and welfare. Attempts have been made to provide cooling systems embedded within the floors of sow farrowing crates to reduce the impact of heat stress on sows and improve sow productivity and reproductive performance by local removal of excess heat from the animals. However, such known attempts to date have been limited by inefficient heat transfer from the sow and do not allow for changes in the amount of cooling relative to the sow's heat production or surrounding environmental conditions.

In view of the above, it can be appreciated that there is an ongoing desire for systems and methods suitable for cooling an animal that are capable of promoting efficient heat transfer from the animal and adjusting the amount of cooling relative to the animal's heat production and environmental conditions.

BRIEF DESCRIPTION OF THE INVENTION

The present invention provides systems and methods suitable for cooling an animal and capable of promoting efficient heat transfer from the animal, and preferably also capable of adjusting the amount of cooling relative to the animal's heat production and environmental conditions.

According to one aspect of the invention, a system for cooling an animal is provided that includes a metallic panel having an upper surface for contacting the animal and a lower surface, at least one metallic cooling element that thermally contacts the lower surface of the metallic panel and has an internal passage therein, and means for flowing a coolant through the internal passage of the metallic cooling element. Flow of the coolant through the metallic cooling element reduces the temperature of the upper surface of the metallic panel and thereby reduces the body temperature of the animal when the animal is in contact with the metallic panel.

According to another aspect of the invention, a method of cooling an animal is provided that includes locating the animal on an upper surface of a metallic panel, and then flowing a coolant through an internal passage of at least one metallic cooling element that thermally contacts the lower surface of the metallic panel such that the temperature of the upper surface of the metallic panel, and consequently the body temperature of the animal, is reduced.

Technical effects of the method and system described above preferably include the ability to actively cool an animal relative to ambient temperature of the environment to which the animal is exposed, which can have the effect of promoting the well-being and possibly the feed and reproductive performance of the animal.

Other aspects and advantages of this invention will be further appreciated from the following detailed description.

DETAILED DESCRIPTION OF THE INVENTION

This disclosure provides systems and methods capable of cooling an animal, for example, a sow within a farrowing barn that is maintained at an ambient environmental temperature that is higher than what is desired for optimal performance of the sow. As an example, farrowing rooms of swine farrowing operations are often maintained at ambient temperatures of about 25° C. for nine months of the year, and they can often be warmer during summer months. Since milk production, daily feed intake performance, and expression of estrus after weaning have all been linked to the reaction of the animal to the ambient environmental temperature, agricultural production can be improved by regulating the animal's body temperature to promote its reproductive performance. In addition to potential improvements to production, regulation of the animal's body temperature relative to the ambient environmental temperature may significantly improve the welfare and well-being of the animal. As such, the systems and methods disclosed herein preferably provide economical active cooling for an adult animal. Although the invention will be described herein with specific references to a sow in a farrowing barn, it is foreseeable and within the scope of the invention that the invention may be applicable to other environments, other animals, or other cooling or heating applications. For example, the system could be used in a boar pen or a breeding gestation pen or stall.

Figure 1:
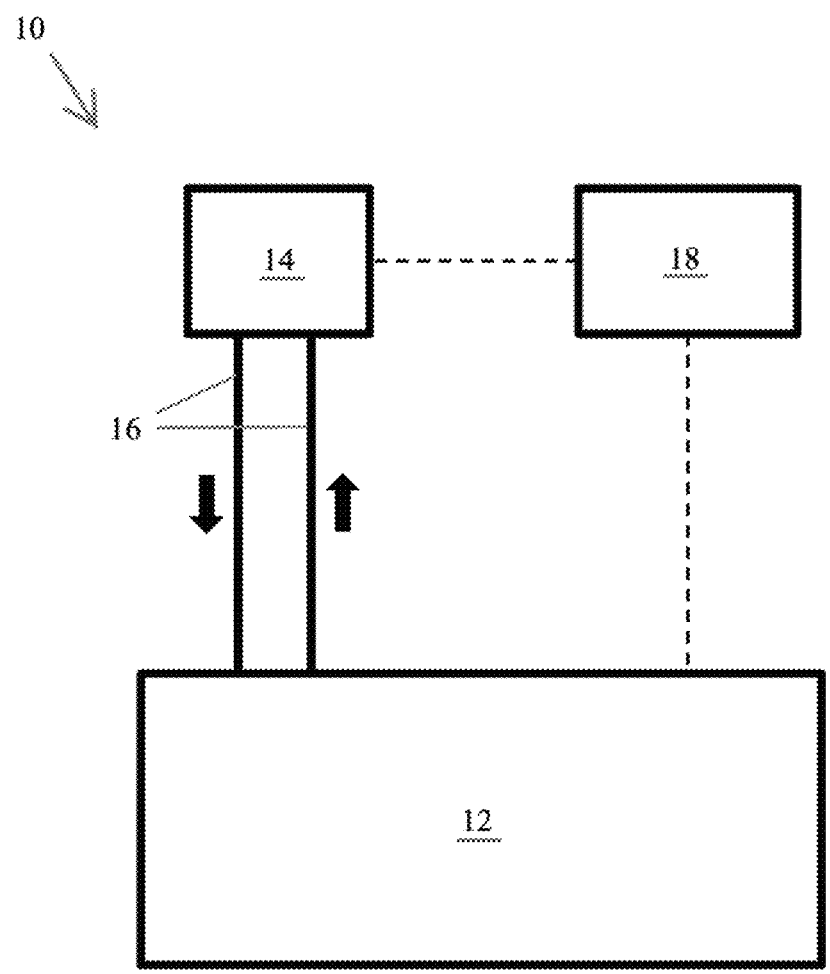
FIG. 1 schematically represents a nonlimiting embodiment of a system configured to remove excess heat from an animal in elevated ambient temperature environments.

FIG. 1 schematically represents a nonlimiting system 10 configured to remove excess heat from an animal in an elevated ambient temperature environment. During its operation, the system 10 flows a coolant, for example water, from a coolant supply 14 through a cooling pad 12 to remove heat from an animal laying on the pad 12. As the coolant increases in temperature during the operation of the system 10, the coolant may be discharged, for example, into a waste pit under a sow's farrowing crate (not shown), or it may be reconditioned thermally and reused. In FIG. 1, the system 10 is represented as a closed loop system that includes supply and return lines 16 through which the coolant flows, respectively, from the supply 14 to the pad 12 and from the pad 12 to the supply 14. The coolant supply 14 preferably incorporates a cooling unit, for example, a chiller, geothermal heat exchanger, or other device to decrease the temperature of the coolant returned from the pad 12 such that it may be reused. Alternatively, the system 10 could include a cooling unit as a separate and discrete unit of the system 10.

The system 10 is represented in FIG. 1 as further comprising a control unit 18 for controlling the flow rate of the coolant through the pad 12. The control unit 18 may control coolant flow through valves incorporated into the coolant supply 14 or as a separate unit of the system 10. The control unit 18 is preferably adapted to monitor various conditions within the system 10 and adjust the flow rate of the coolant to maintain a desired temperature when the animal is lying on the cooling pad 12. For example, the control unit 18 may monitor parameters of the cooling pad 12, such as the temperature of the cooling pad 12, parameters of the system 10, such as input and output temperatures of the coolant from the cooling pad 12, and/or the flow rate of the coolant, parameters of the environment, such as the temperature and relative humidity of the air in the proximity of the cooling pad 12, and/or parameters of the animal, such as physiological changes relating to but not limited to the body temperature of the animal, the skin temperature of the animal, the rectal temperature of the animal, the vaginal temperature of the animal, or temperament of the animal. To this end, the system 10 may include various sensors located in and/or in proximity to the cooling pad 12, coolant supply 14, and/or other components of the system 10, and/or near or on the animal itself. As a nonlimiting example, the control unit 18 could sense an increase in the respiratory rate of the animal and, since an elevated respiratory rate is a known indicator of increased heat stress, may then provide extra cooling, that is, lower the temperature of the cooling pad 12 by increasing the flow rate of the coolant. Preferably, data collected by the control unit 18 is transmitted to, for example, a central computer and maintained in a database. This data may be used to assist in the refinement of the farrowing operation and enable correlation of sow cooling to production and fertility data. The control unit 18 may adjust the flow rate of the coolant to maintain a desired temperature based on the data or other information. For example, the temperature of the cooling pad 12 may be adjusted in view of a numerical model based upon historical or collected data factors for the specific animal or herd, such as, but not limited to, feed intake and sow parity. The system 10 may be manually controlled, or may be directly or remotely autonomously controlled by, for example, preprogrammed instructions.

The cooling pad 12 may be structured to be located in and fit within a farrowing crate. For example, the cooling pad 12 may lie over the flooring of a crate and cover limited portions thereof that are set apart from the area within or adjacent the crate occupied by the sow's piglets, so that the cooling function of the system 10 will not adversely affect the elevated temperatures desired for the piglets. As nonlimiting examples, a cooling pad for a sow's farrowing crate may cover the width of the flooring (generally about 0.6 meters) and approximately half of the length (generally about one meter), so that while the sow is at rest at least her head, neck, and shoulder area will contact and be supported by the pad 12. If used in a boar pen, the cooling pad may be larger, preferably large enough for a mature boar to lie down with its entire body surface on the cooling pad. If used in gilt replacement pens or finishing barns, the cooling pad can be positioned to allow a portion of the animal's floor space to be cooled, while another portion remains open for other activities, such as manure handling.

Figure 2:
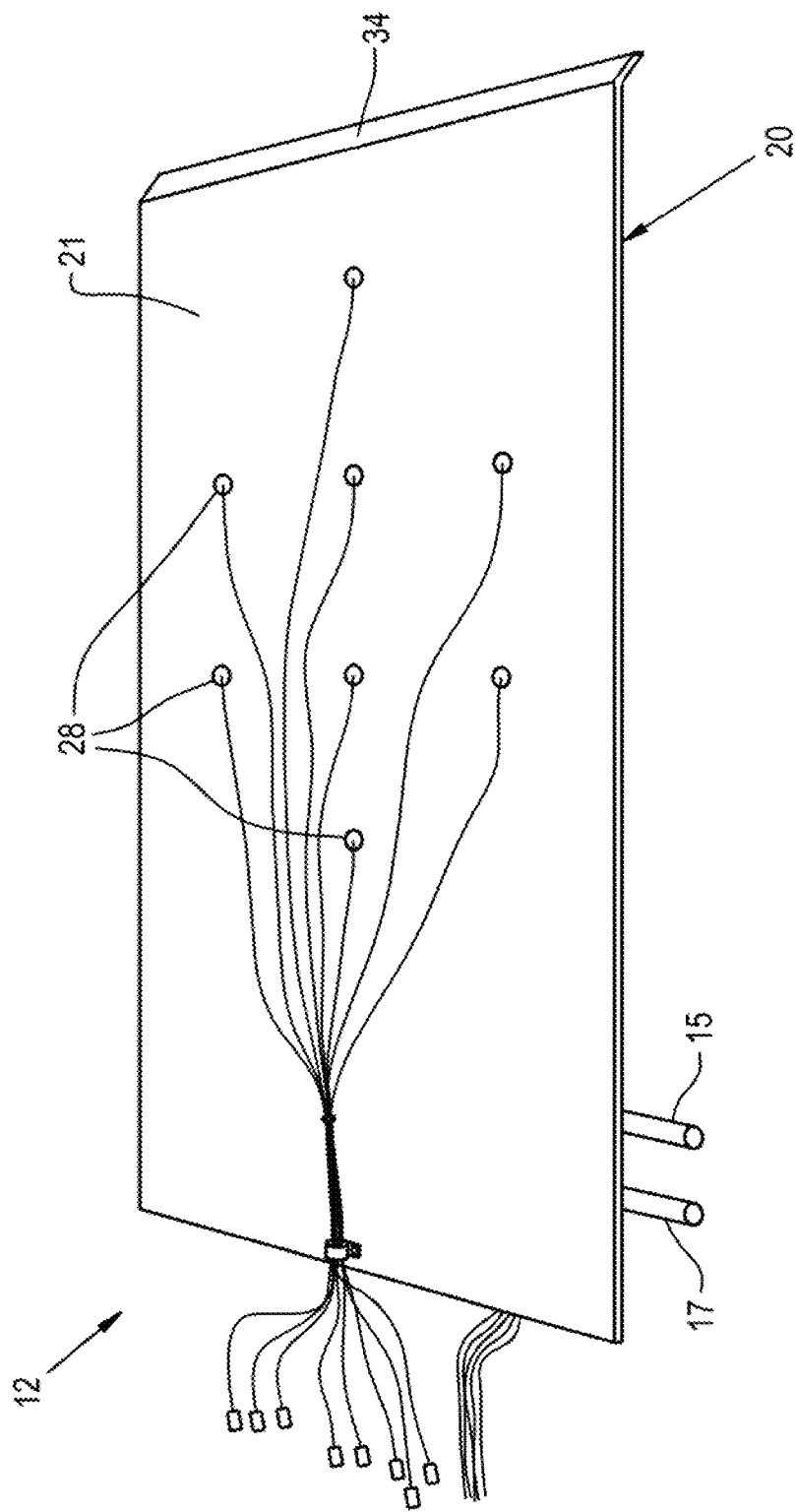
FIG. 2 is a perspective view schematically representing an upper surface of a nonlimiting embodiment of a cooling pad.
Figure 3:
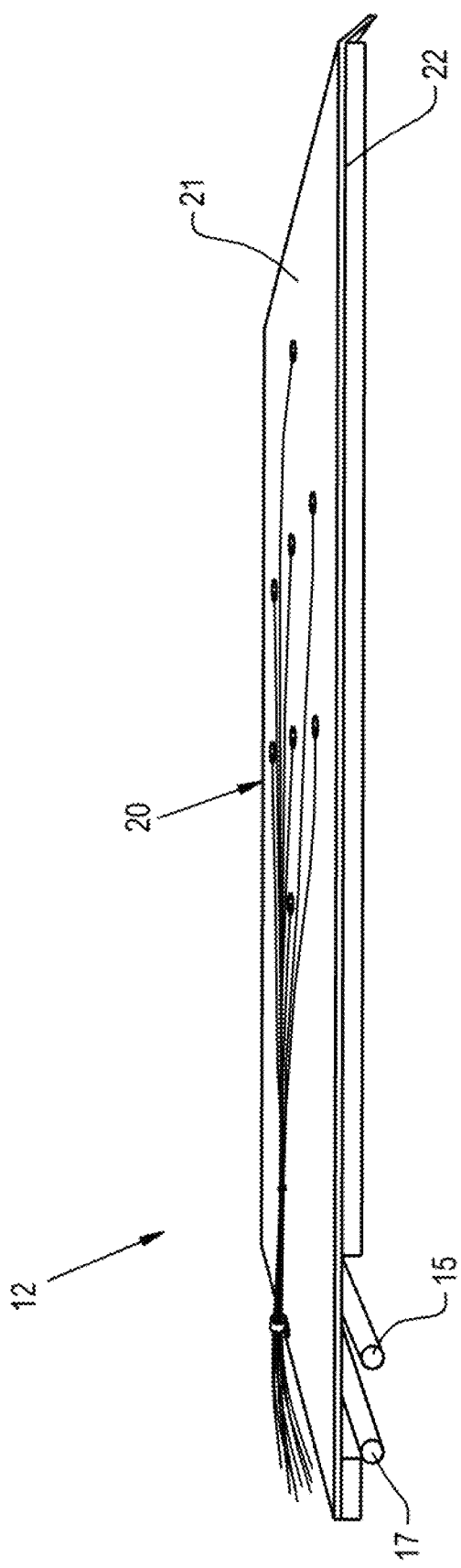
FIG. 3 is a side view schematically representing the cooling pad of FIG. 2.
Figure 4:
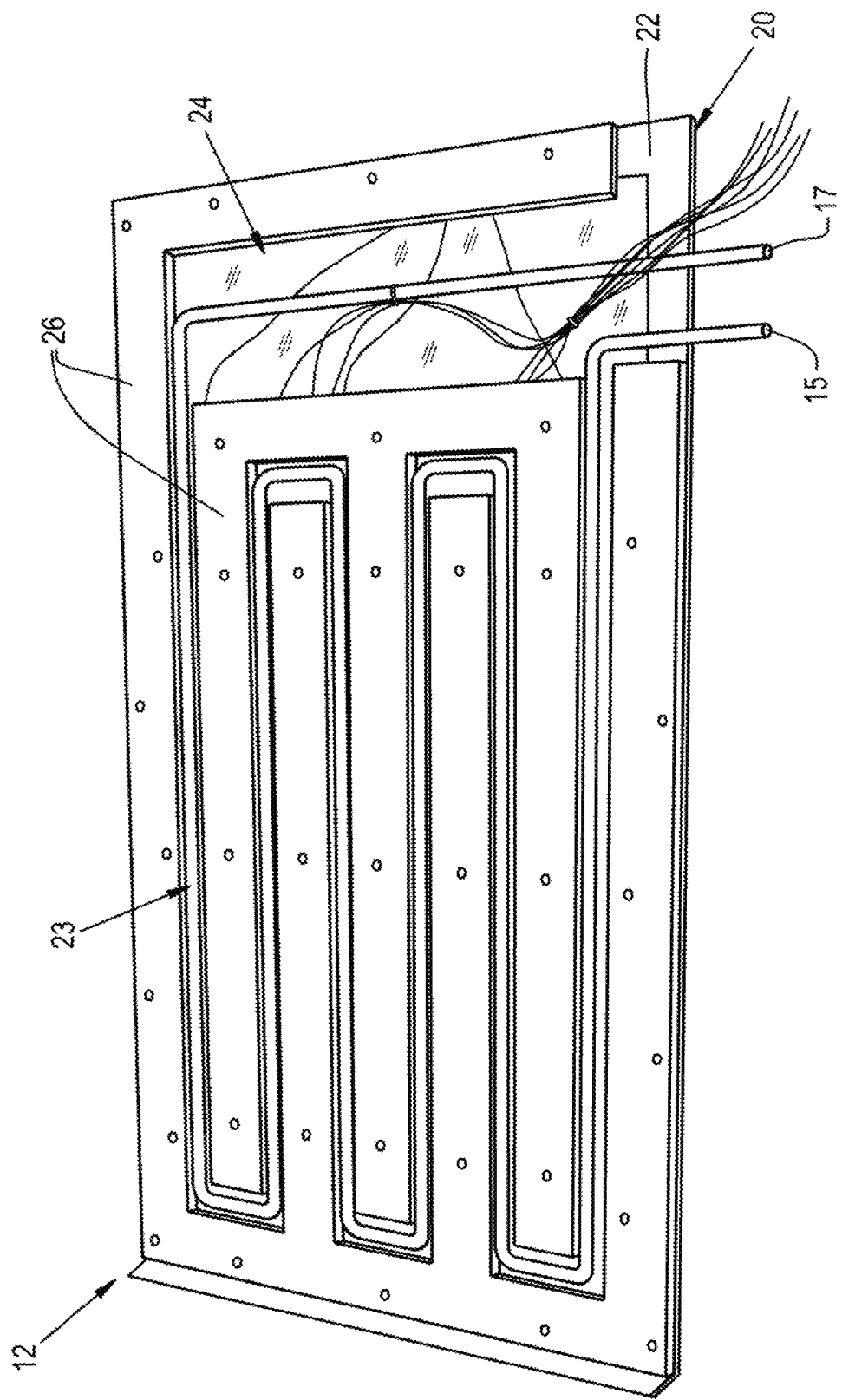
FIG. 4 is a perspective view schematically representing a lower surface of the cooling pad of FIG. 2.

FIGS. 2-4 schematically represent various views of a nonlimiting cooling pad 12 that is particularly sized and configured to lower the body temperature of a sow in a farrowing crate. To facilitate the description of the cooling pad 12, relative terms, including but not limited to, "vertical," "horizontal," "lateral," "side," "upper," "lower," "above," "below," etc., may be used in reference to the orientation of the cooling pad 12 during its use in a farrowing crate. The cooling pad 12 includes a thermally conductive panel or body 20, for example a metallic plate, having an upper surface 21 and a lower surface 22. The upper surface 21 is intended to be contacted by the sow, for example, when the animal lies down on the cooling pad 12. The lower surface 22 is preferably in thermal contact with at least one cooling element 23 capable of lowering the temperature of the thermally conductive body 20 to thereby lower and/or regulate the temperature of the animal resting on the upper surface 22. Although the pad body 20 is represented as a planar plate, it is foreseeable that the pad body 20 may have other shapes and construction. For example, the pad body 20 may include legs or other reinforcements to promote the rigidity of the pad body 20 and support a load applied to the upper surface 21, for example the body weight of an animal thereon.

In the nonlimiting embodiment represented in FIGS. 2-4, the cooling element 23 is in the form of a thermally conductive conduit, for example a metallic pipe, that thermally contacts the lower surface 22 of the pad body 20. As such, the cooling element 23 has an internal passage configured to have a coolant flow therethrough. During operation of the system 10, the coolant enters the cooling element 23 through an inlet 15, flows through the cooling element 23, and exits the cooling element 23 through an outlet 17 before returning to the supply 14. The inlet 15 and outlet 17 are represented as located on one side of the cooling pad 12 to avoid conflict with a feeder or crate bars commonly found in farrowing crates, but the inlet 15 and outlet 17 may transition to and from the cooling pad 12 at any location.

Figure 5:
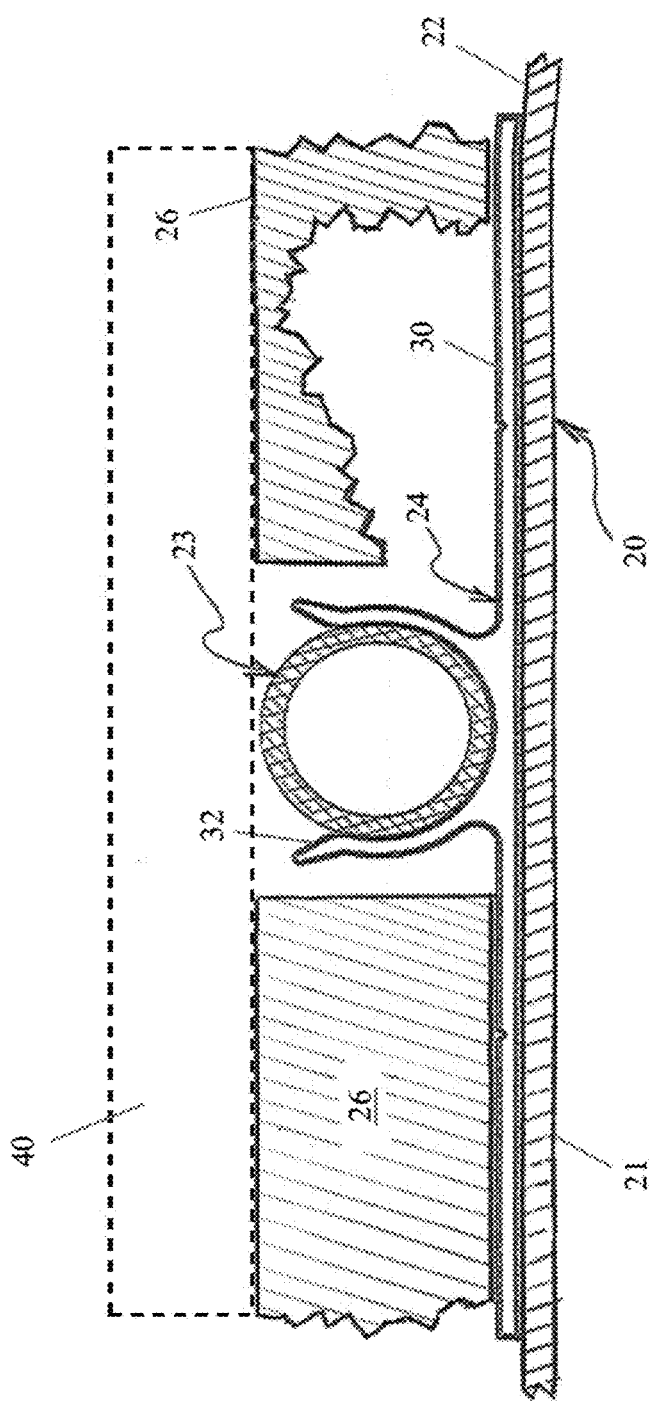
FIG. 5 is a cross-sectional view schematically represents an isolated portion of the cooling pad of FIG. 2 taken along a section line transverse to a longitudinal length of the cooling pad.
Figure 6:
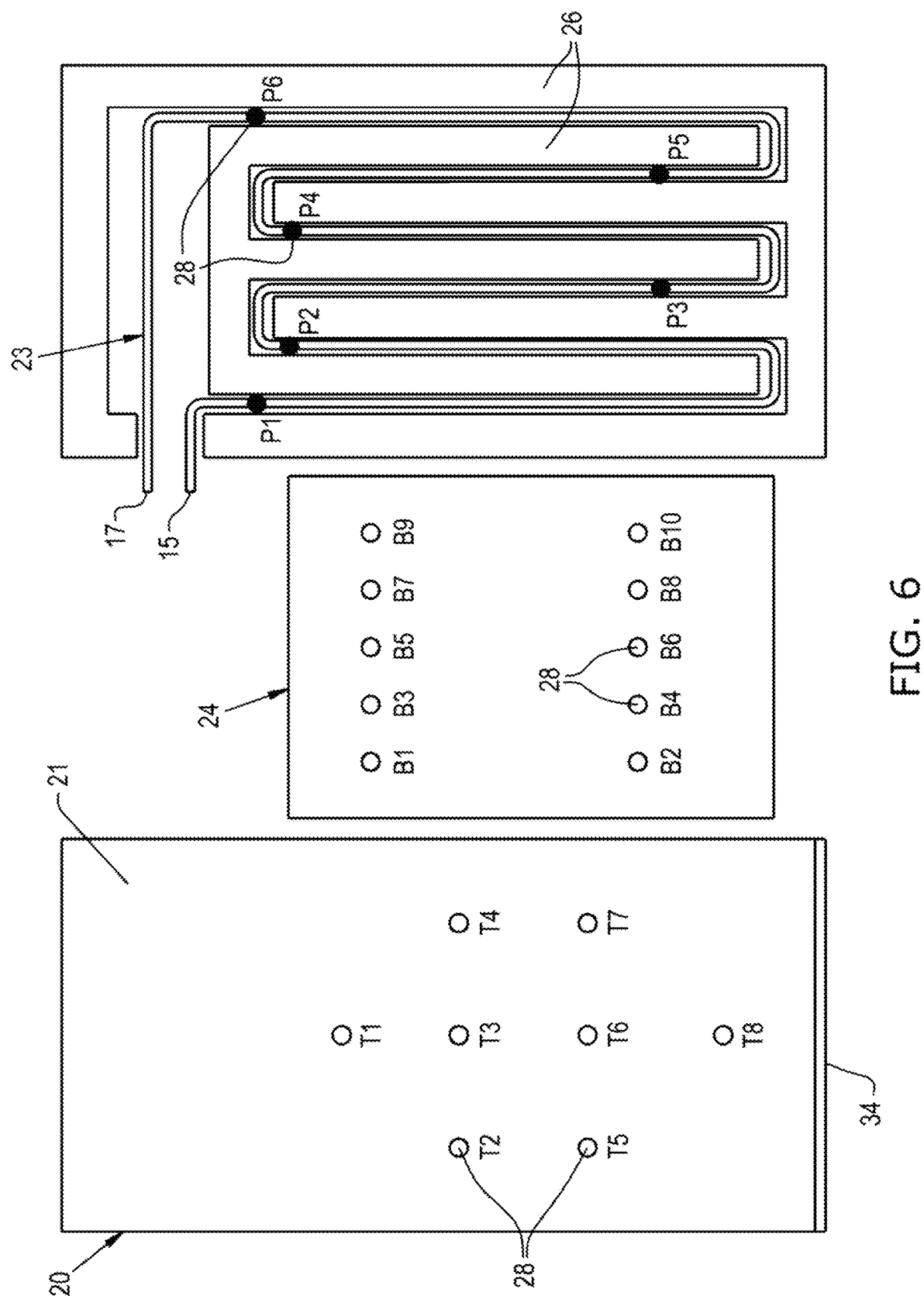
FIG. 6 schematically represents isolated layers of the cooling pad of FIG. 2.
Figure 7:
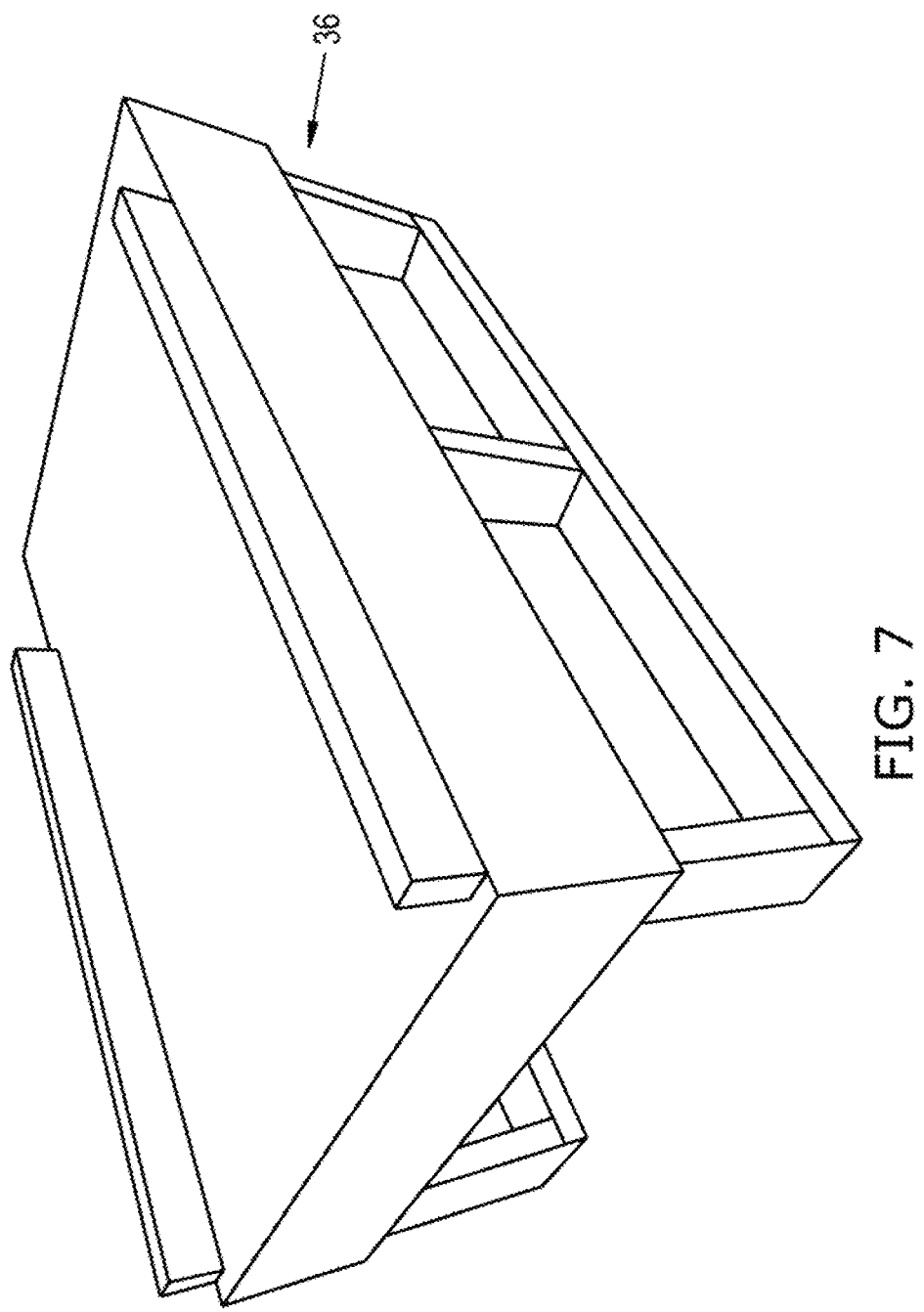
FIG. 7 schematically represents a base capable of supporting the cooling pad of FIG. 2 for testing.
Figure 19:
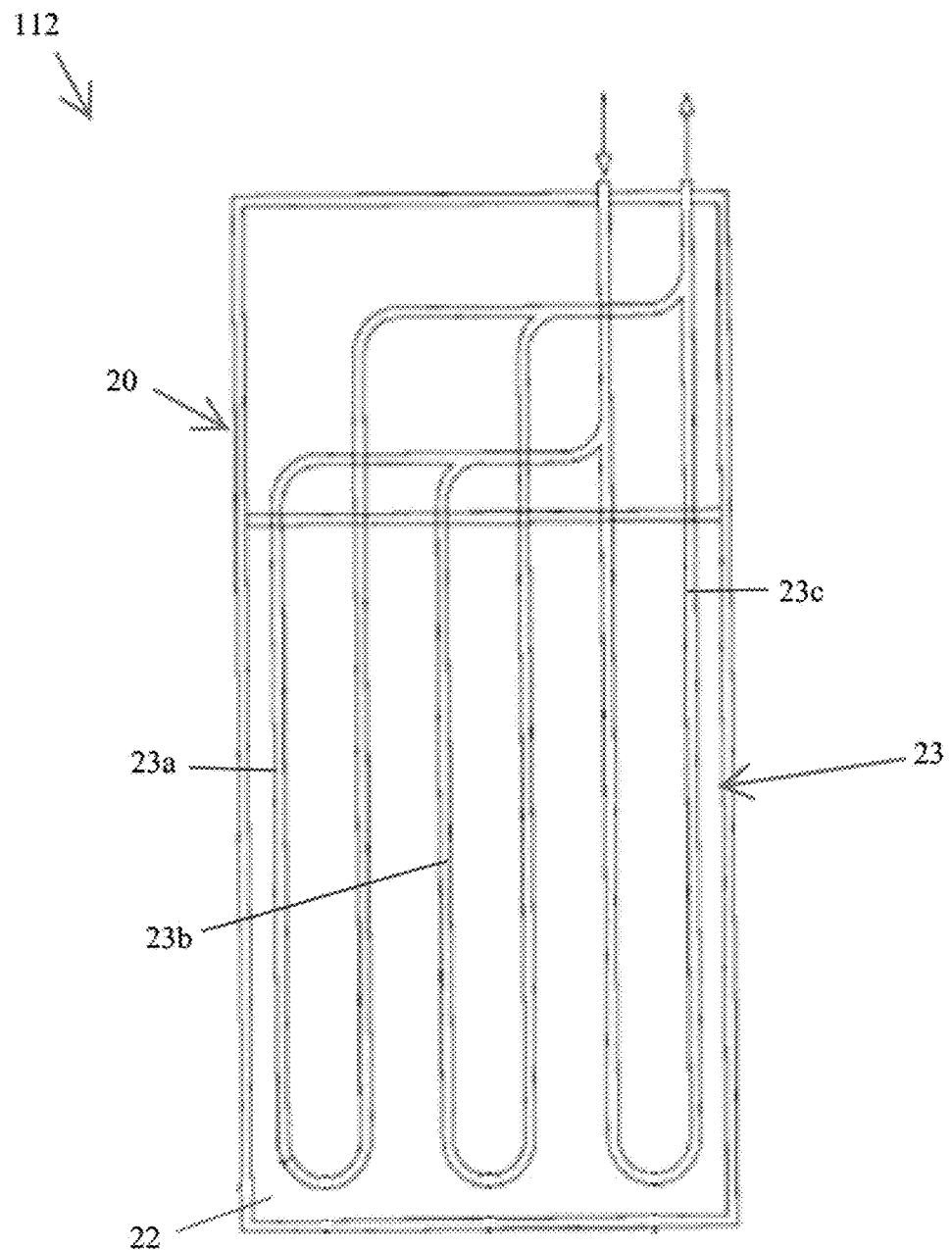
FIG. 19 is a bottom view schematically representing a second nonlimiting embodiment of a cooling pad.

The cooling element 23 preferably promotes a relatively uniform temperature across the upper surface 21 of the pad 12. To this end, the cooling element 23 is represented in FIGS. 4 and 6 as having a serpentine or circuitous path at the lower surface 22 of the pad body 20, thereby promoting an more uniform temperature across the upper surface 22 assisted by the thermal conductivity of the pad body 20. It should be understood that the cooling element 23 is not limited to the specific pattern represented in the drawings, and that other patterns may be used in combination with one or more cooling elements arranged in series or in parallel. FIG. 19 schematically represents a bottom view of an alternative embodiment of a cooling pad 112 having a cooling element 23 comprising three circuits 23a, 23b, and 23c that are hydraulically in parallel. For convenience, identical reference numerals are used in FIG. 19 to denote the same or functionally equivalent elements as described for the cooling pad 12 of FIGS. 2-8.

In order to promote the efficient regulation of an animal's body temperature, the cooling pad 12 preferably promotes heat transfer from the animal at relatively low temperature gradients, resists heat transfer from the surrounding environment, and is responsive to varying operational input conditions, for example, by allowing for relatively quick adjustments to the temperature of the upper surface 21. Therefore, the cooling pad 12 is preferably insulated to reduce heat transfer from the cooling element 23 in any direction other than toward the upper surface 21. As such, FIGS. 4 through 6 represent the cooling pad 12 as including an insulating material 26 configured to reduce the rate of thermal transfer between the cooling element 23 and the surrounding environment other than the pad body 20. Although the insulating material 26 is represented as located only on lateral sides of the cooling element 23 thereby reducing heat transfer in lateral directions relative to and below the pad body 20, it is foreseeable that the insulating material 26 may cover or insulate all portions of the cooling element 23 not in thermal contact with the lower surface 22 and thereby reduce heat transfer in all directions except from the upper surface 21. For example, FIG. 5 represents the cooling pad 12 as comprising an optional, additional layer of insulation 40 which may be a separate layer or may be part of the insulating material 26. In addition to or as an alternative to the insulating material 26, the cooling pad 12 may be located over an insulated cavity. As a nonlimiting example, a pit under a sow's farrowing crate (not shown) may be insulated (for example, along its walls) to reduce heat transfer between the cooling element 23 and surfaces other than the pad body 20.

The cooling pad 12 may optionally include means for promoting heat transfer between the cooling element 23 and the lower surface 22 of the pad body 20. For example, FIGS. 4 through 6 represent the cooling pad 12 as having a thermally conductive intermediate member 24 that is located between the pad body 20 and the cooling element 23 and configured to increase the heat transfer rate therebetween. FIG. 5 depicts the intermediate member 24 as including a panel 30 attached directly to the lower surface 22 of the pad body 20 and means 32 for retaining the cooling element 23 in physical contact with the intermediate member 24. In the nonlimiting embodiment represented, the retaining means 32 comprises an array of C-shaped channels configured to receive and retain portions of the cooling element 23. FIG. 5 schematically represents a cross-sectional view of one of the C-shaped channels in a direction transverse to its longitudinal axis, and it shows the channel as engaging the majority of the circumference of the cooling element 23. By directly contacting the cooling element 23 with the retaining means 32 in this manner, a larger surface area of the cooling element 23 is effectively in thermal communication with the pad body 20, such that the intermediate member 24 serves to increase heat transfer between the cooling element 23 and pad body 20.

The cooling pad 12 may optionally include various additional components configured to assist in locating and securing the cooling pad 12 in a desired location, for example, within a farrowing crate, and to promote comfort of the animal therein. In FIG. 2, the righthand end of the pad body 20 can be seen to have an approximately forty-five degree bevel that is intended to reduce exposure of the animal to sharp edges and thereby promote the comfort and safety of a sow in a farrowing crate. Fasteners (not shown), such as hook fasteners, can be secured to various locations, for example, on each corner, of the cooling pad 12 for use in securing the cooling pad 12 in a fixed location within the farrowing crate. In investigations leading to the present invention, a base 36 (FIGS. 7 and 8) was provided to support the cooling pad 12 and further insulate lower portions thereof.

Various materials may be used for the components of the system 10. Preferably, corrosion resistant metals, alloys, or polymer materials are used, since locations such as farrowing crates tend to have harsh, moist environments which may promote mold growth and decay of certain materials. As a nonlimiting example, a cooling pad 12 constructed and used in investigations discussed below included a treaded, aluminum plate for the pad body 20, an aluminum panel commercially available from Radiant Engineering under the trademark ThermoFin C™ as the intermediate member 24, soldered copper tubing and fittings for the cooling element 23, iron fasteners for securing the intermediate member 24 to the pad body 20, high density polyurethane (HDPE) for the insulating material 26, and wood for the base 36.

Thermal characteristics of the cooling pad 12 were studied in a series of investigations leading to the present invention. Therefore, nonlimiting embodiments of the invention will now be described in reference to experimental investigations leading up to the invention.

A prototype embodiment of the cooling pad 12 was instrumented for automatic data acquisition at various locations for temperature and coolant flow rate. Thermal sensors 28 (type F thermocouples) were installed at three levels within the cooling pad 12, including on the upper surface 21, on the intermediate member 24 between the channels 32, and directly on the cooling element 23. The installation pattern and identification key for the sensors 28 is represented in FIG. 6. Additionally, thermocouples measured the temperature of the coolant at the inlet 15 and outlet 17 and at the coolant supply temperature, and additional thermocouples were employed to measure the ambient environmental temperature and the temperatures of an ice bath and boiling water used as references.

Figure 8:
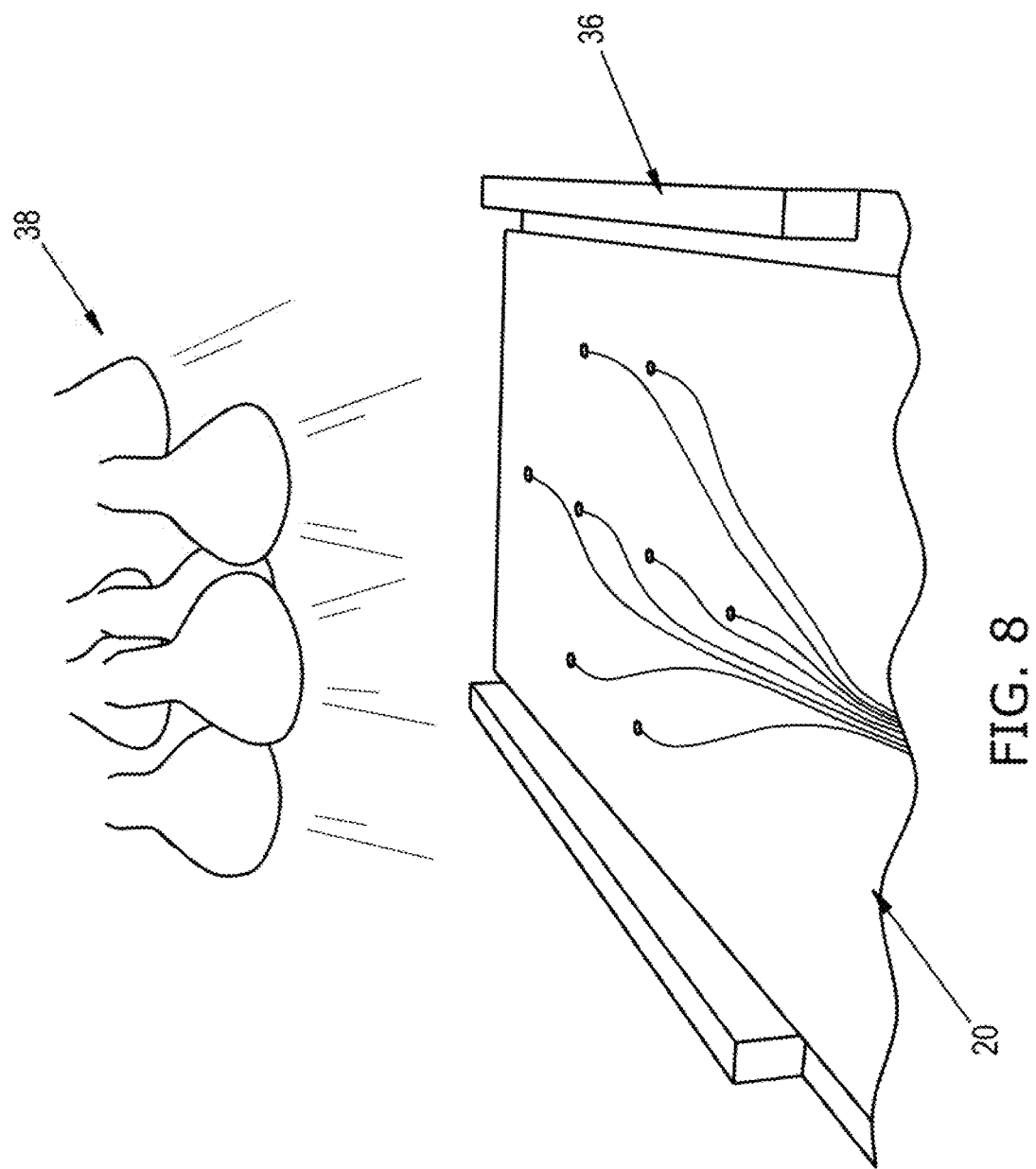
FIG. 8 schematically represents an experimental testing setup comprising an external heat lamp array above a cooling pad and base.

FIG. 8 shows the experimental setup as including the cooling pad 12 supported on the base 36, consistent with the expected installation of the cooling pad 12 within a slotted metal farrowing crate common in the industry. The setup further included a heat lamp array 38 to elevate the temperature of the cooling pad 12 and the ambient environmental temperature. Operation of the cooling pad 12 during the investigations was believed to be consistent with its expected use within a farrowing barn.

External thermal energy was supplied by the heat lamp array 38 to the cooling pad 12 until a specific set of starting conditions had been reached, that is, a temperature above a ground state, based upon the ambient environmental temperature. Once the cooling pad 12 reached a set of conditions where at least two of the sensors 28 on the upper surface 21 exceeded 35° C. and at least two of the sensors 28 on the intermediate member 24 exceeded 30° C., a data acquisition system was initiated, the heat lamp array 38 was deactivated, and coolant flow was initiated. Five flow rates were evaluated as well as a no-flow (free convection) condition as reference. There were two repetitions conducted at each flow rate.

Flow mechanisms can significantly affect heat transfer coefficients. In order to determine the flow regime for the coolant flow in the cooling pad 12, Reynolds Numbers (Re) for the coolant circuit were calculated using published values for physical properties and component dimensions and the measured flow rate volumes. The calculated data is represented in Table 1. It was determined that all of the utilized flow rates, with the exception of the lowest flow rate (1.0 l/min), were well within the turbulent flow range. The second lowest flow rate (1.9 l/m) corresponded to a Re value of roughly 3000, which is on the high end of the transition between laminar and turbulent flow. However, due to the serpentine nature of the flow path and the probable nature of the operational environment of the cooling pad 12, it was assumed that the flow at this level was also turbulent and that heat transfer at this flow rate was occurring within the turbulent fluid flow regime. The lowest flow rate (1.0 l/min) appeared to correspond with laminar flow.

TABLE 1

Experimental Reynolds Numbers for Investigations.

| Voltage (V) | Vol. Flow (l/min) | Velocity (m/s) | Mass Flow (kg/s) | Re |
|---|---|---|---|---|
| 0.825 | 14.1 | 1.66 | 0.234 | 22300 |
| 0.535 | 9.2 | 1.08 | 0.153 | 14500 |
| 0.180 | 3.2 | 0.38 | 0.053 | 5030 |
| 0.105 | 1.9 | 0.23 | 0.032 | 3020 |
| 0.060 | 1.0 | 0.13 | 0.177 | 1680 |

Figure 9:
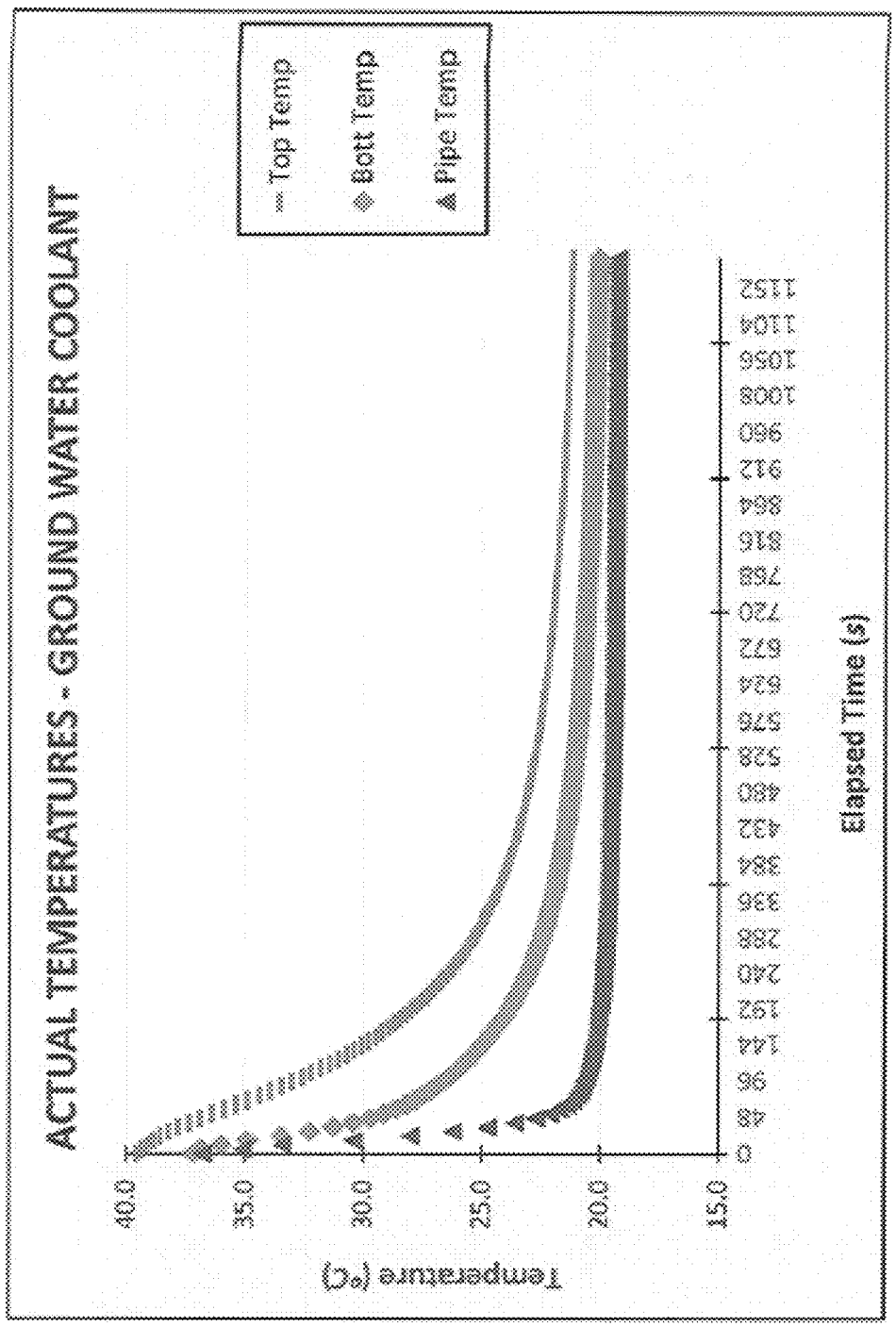
FIG. 9 is a plot representing typical thermal responses of the cooling pad of FIG. 8.
Figure 10:
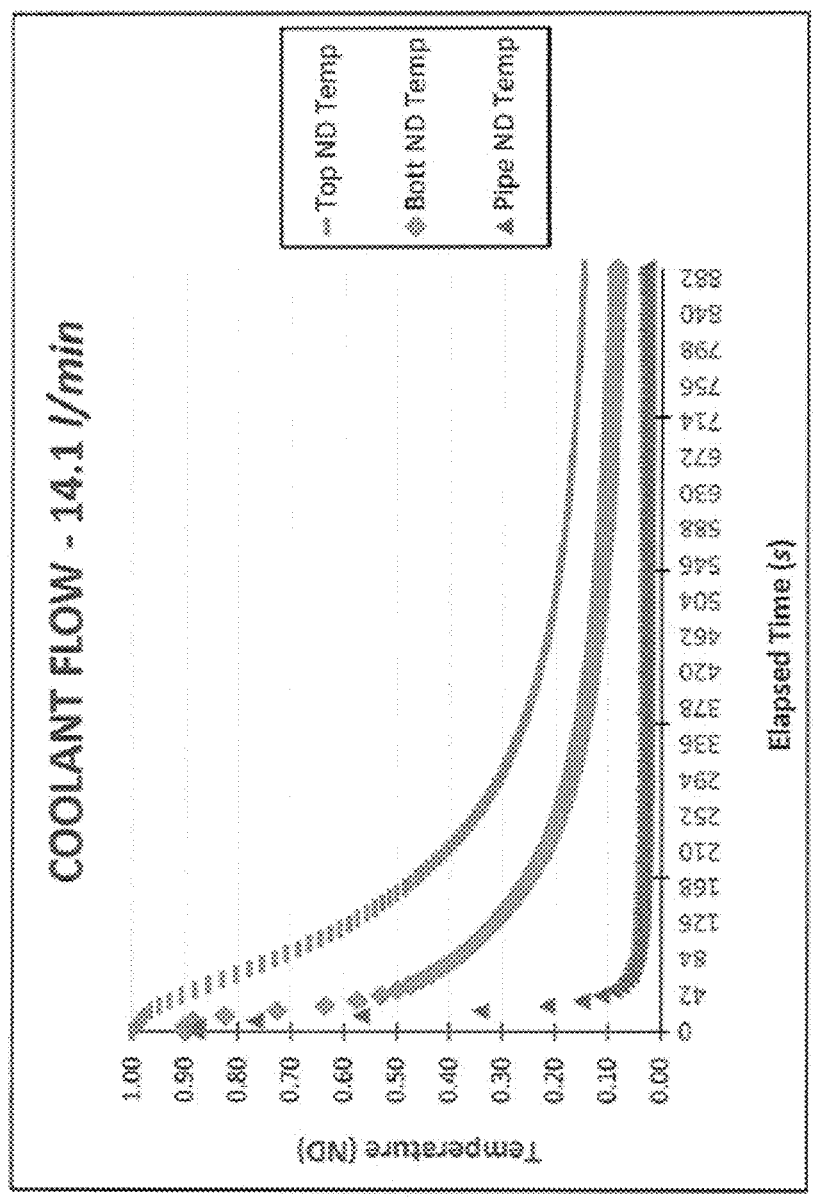
FIGS. 10 through 15 include plots representing temperature averages of the cooling pad of FIG. 8 at coolant flows of, respectively, 14.1, 9.2, 3.2, 1.9, 1.0, and 0.0 (no coolant flow) liters per minute (l/min).
Figure 11:
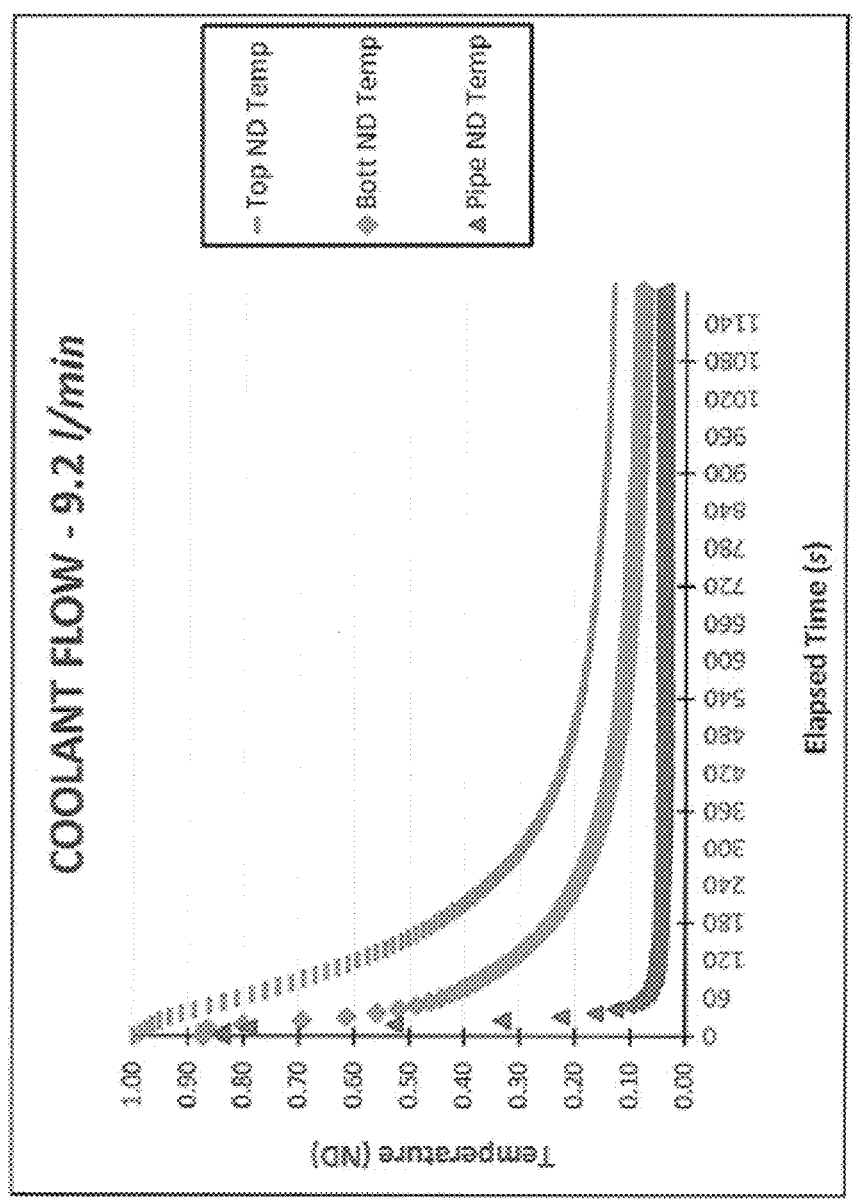
Figure 12:
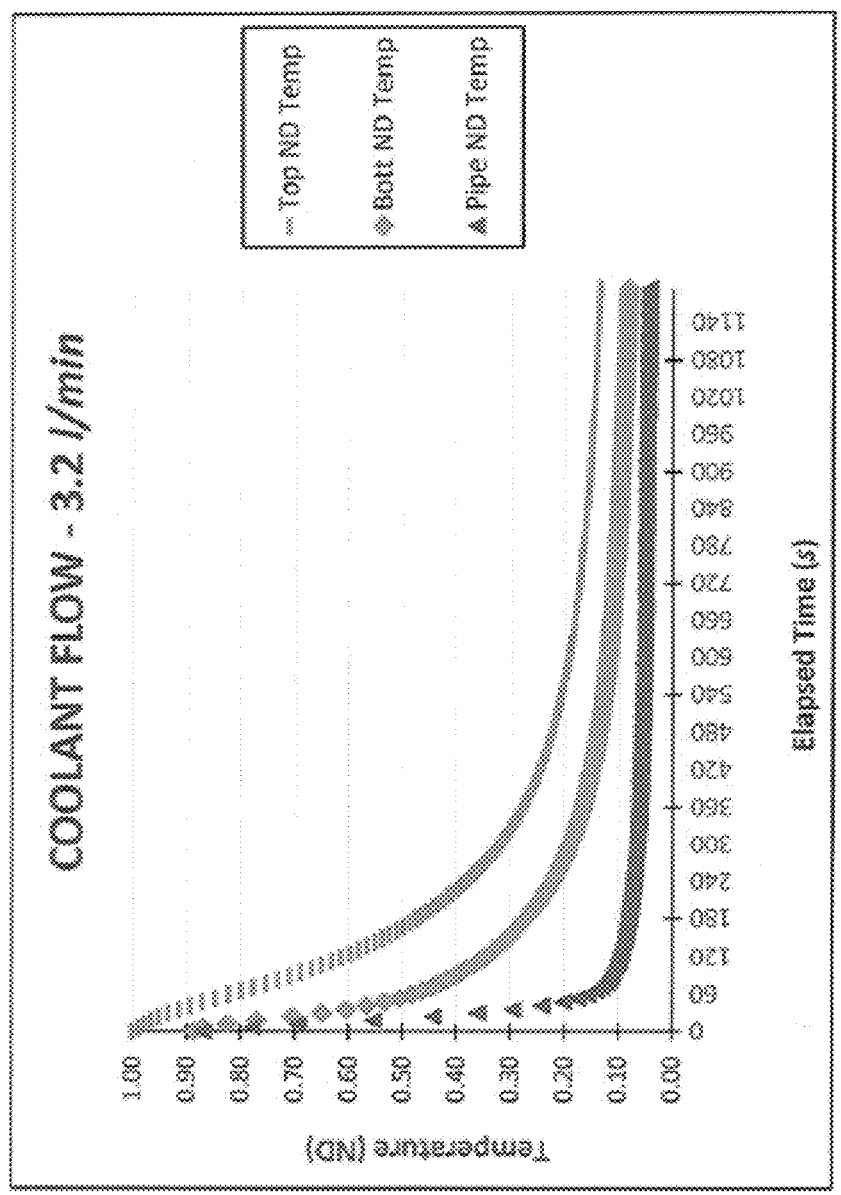
Figure 13:
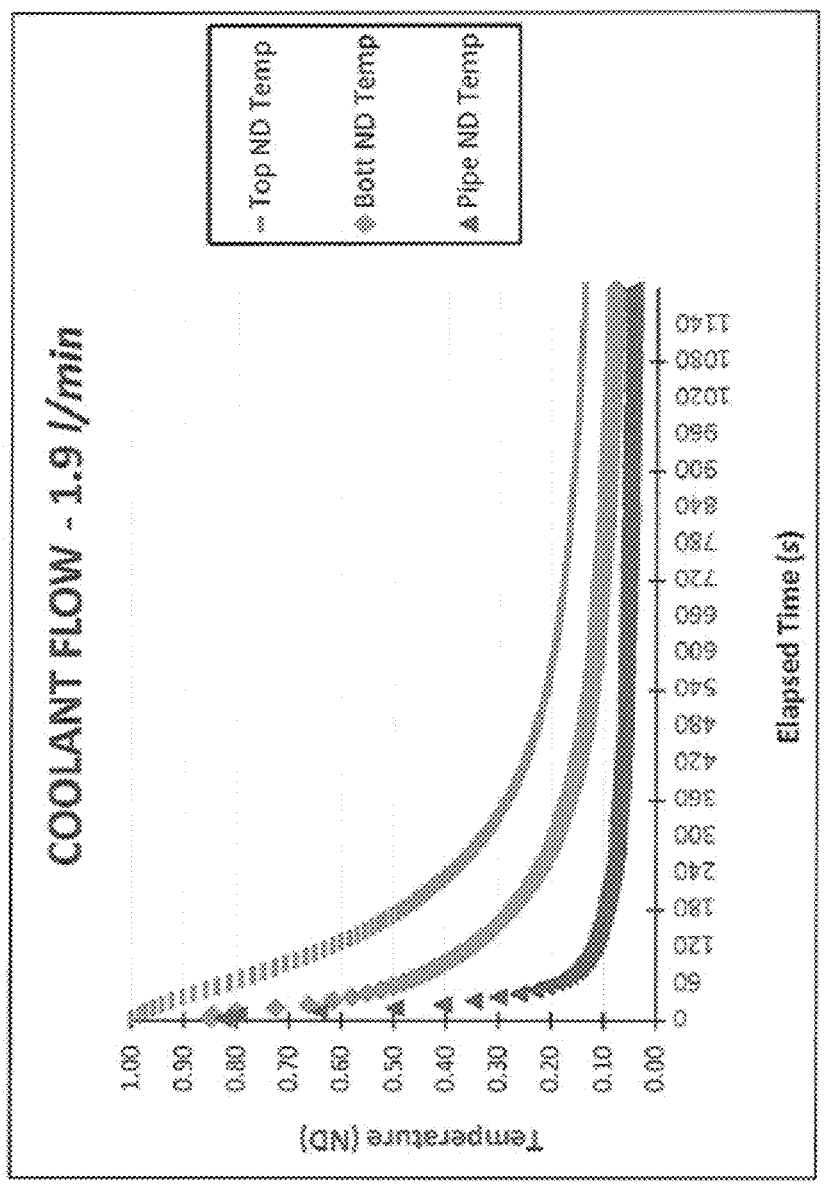
Figure 14:
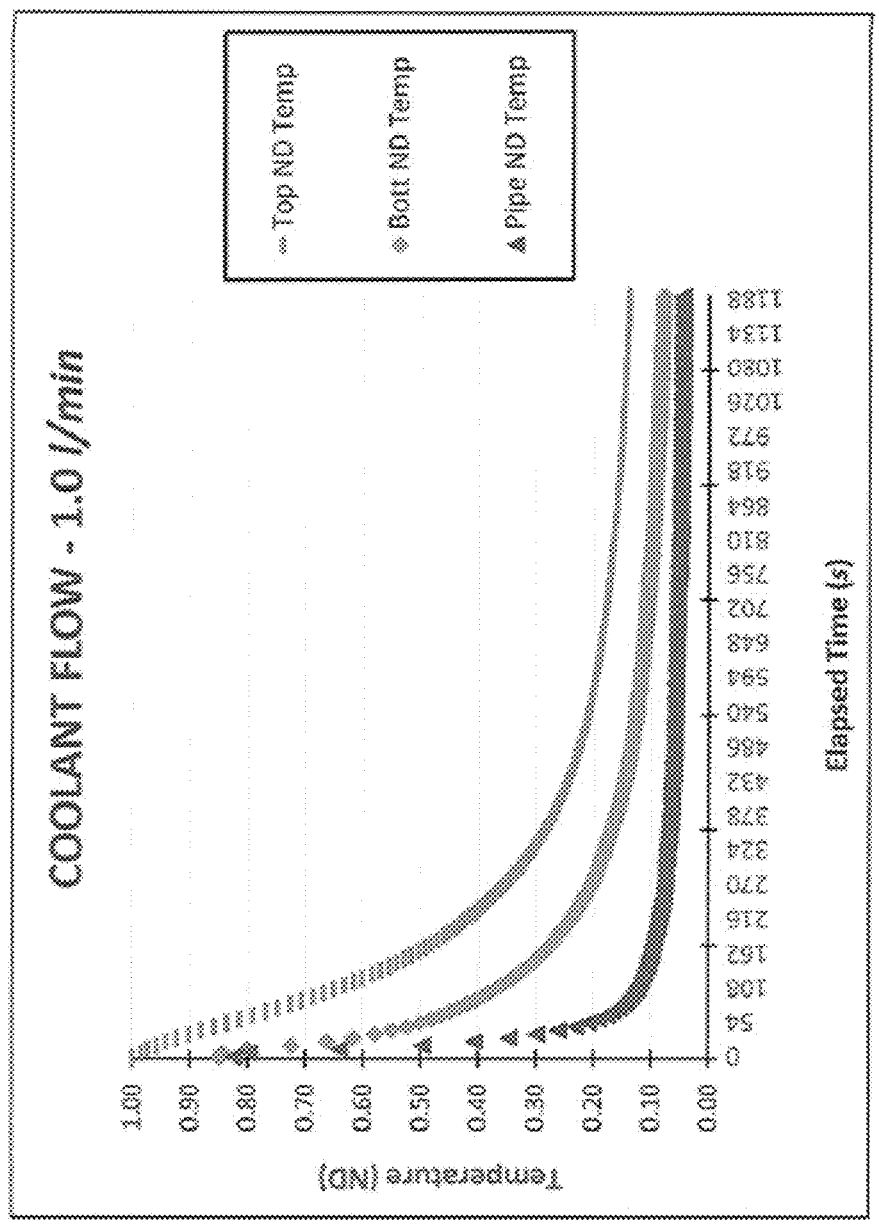
Figure 15:
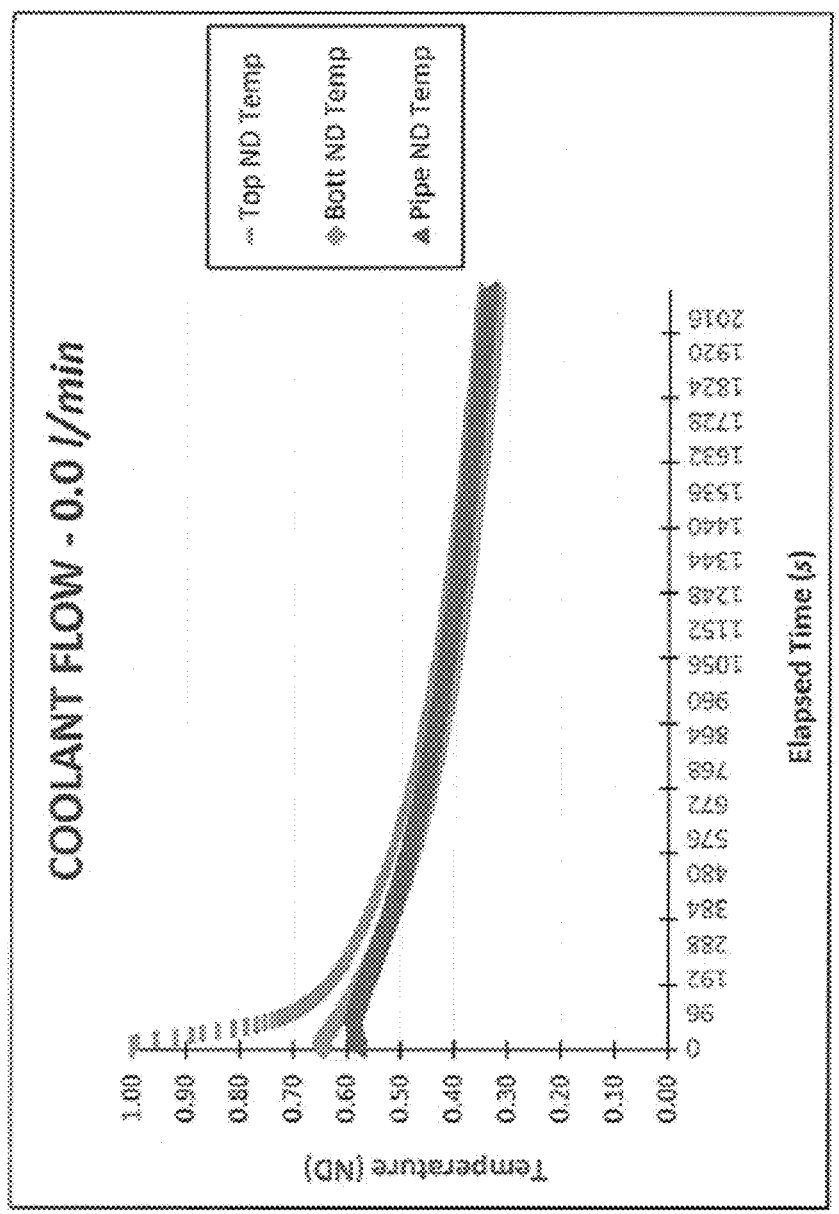

All of the experimental temperature data collected displayed the same general tendencies and form over time. Typical plots of the average temperatures at the three layers of the cooling pad 12 are shown in FIG. 9. The temperature average was computed as a simple arithmetic mean across all valid sensors for both experimental repetitions at the same time increment from the start of the experiment. As expected for a cooling process in a device of this type, the temperature of the cooling element 23 ("Pipe Temp") responded first, followed by the intermediate member 24 ("Bott Temp"), and then the upper surface 21 ("Top Temp").

Physical conditions within the actual experimental system remained reasonably constant across a single experimental run, but varied appreciably throughout the entire testing series. Following standard heat transfer experimental protocol as outlined by Incropera & DeWitt (1981), the thermal data for the capacitive cooling experiments was non-dimensionalized (ND) using the peak temperature average of the upper surface 21 and the driving potential temperature averages for individual experimental conditions. An arithmetic mean based upon elapsed time from the start of the specific experiment was used to create temperature traces for six different cooling fluid flow rates. Both repetitions for each treatment combination have been averaged into a single value. Plots representing the acquired data are presented in FIGS. 10 through 15.

Figure 16:
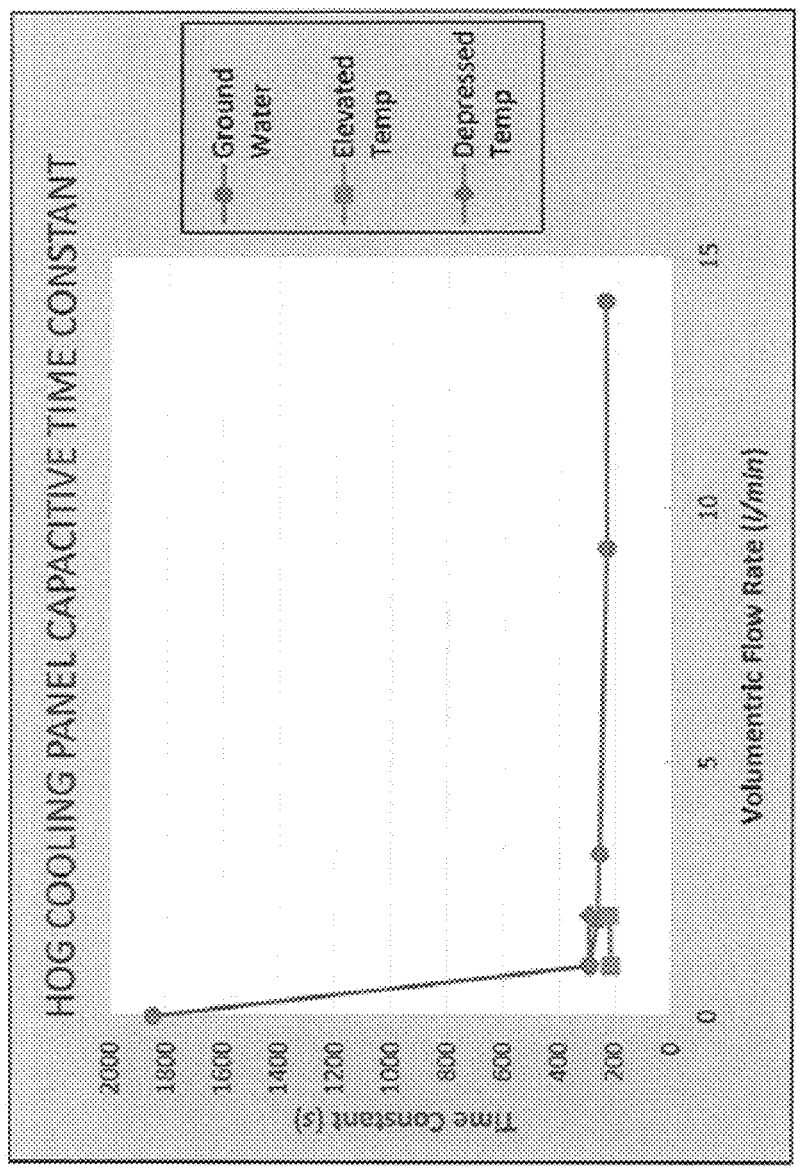
FIG. 16 is a plot representing heat transfer time constants for a cooling pad at various coolant flow rates.

The family of curves showed in FIGS. 10 through 14 have the same general shape and form. Thermal traces for all three levels of measurement across the variety of flow rates examined showed a remarkable consistency. FIG. 16 represents the time constants for this family of tests as a function of the coolant volumetric flow rate. This plot demonstrates that the cooling pad 12 is extremely effective at convective cooling and relatively insensitive to coolant flow rate. The no-flow condition represented in FIG. 15, where the cooling pad 12 is in free convective cooling to the ambient air, displays different temperature traces within the lower levels of the cooling pad 12. The early temperature traces in these plots clearly show the heat traveled upward and off of the upper surface 21, rather than downward and laterally from the cooling element 23. This data indicates that the cooling pad 12 has a strong conductive path for heat transfer between the cooling element 23 and the upper surface 21, and a restricted, or fairly well insulated, heat transfer path from the cooling pad 12 to the surrounding environment. The long time constant for the free convective cooling additionally indicates that the heat transfer from the surrounding environment to the cooling pad 12 during its operation will likely be insignificant compared to the heat transfer from the animal Finally, the performance of the cooling pad 12 demonstrated that it will be reasonably responsive to varying conditions and a computer control system.

Figure 17:
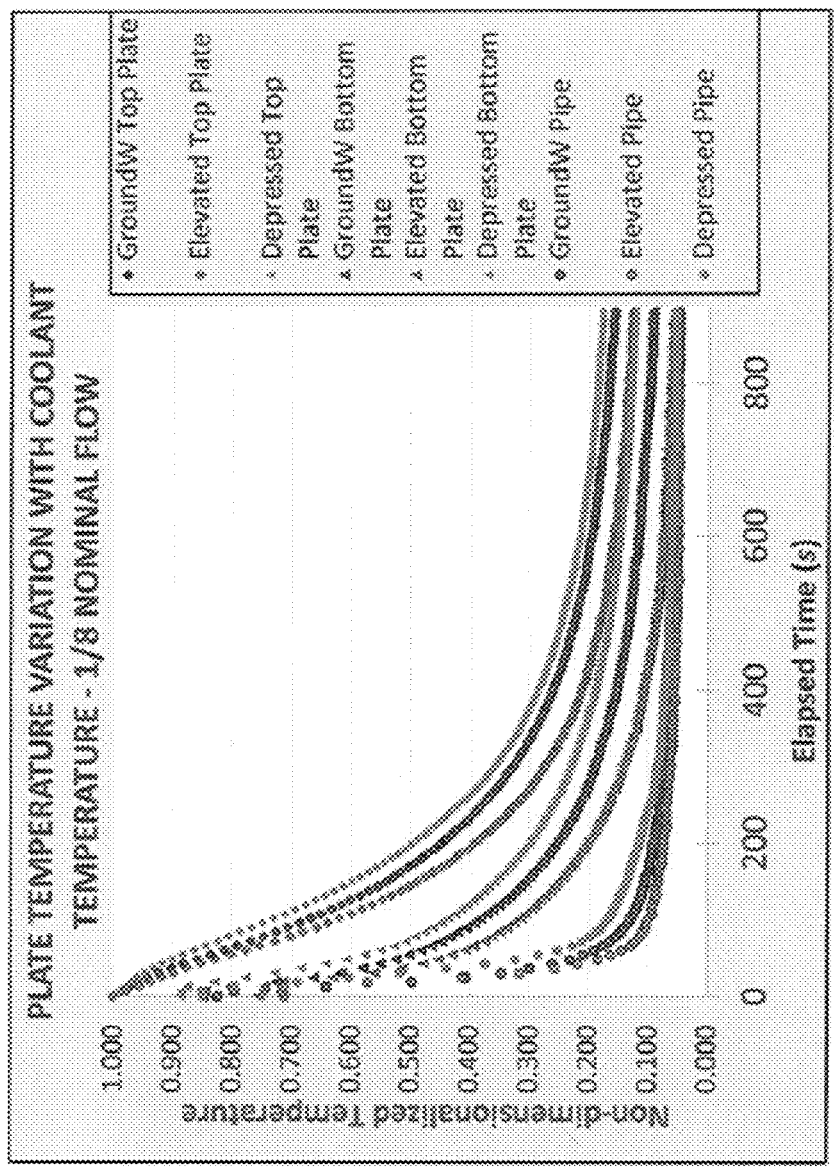
FIGS. 17 and 18 include plots representing component heat transfer responses for a cooling pad when subjected to coolant temperature for 1.9 l/min ("⅛ nominal flow") and 1.0 l/min ("1/16 nominal flow"), respectively.
Figure 18:
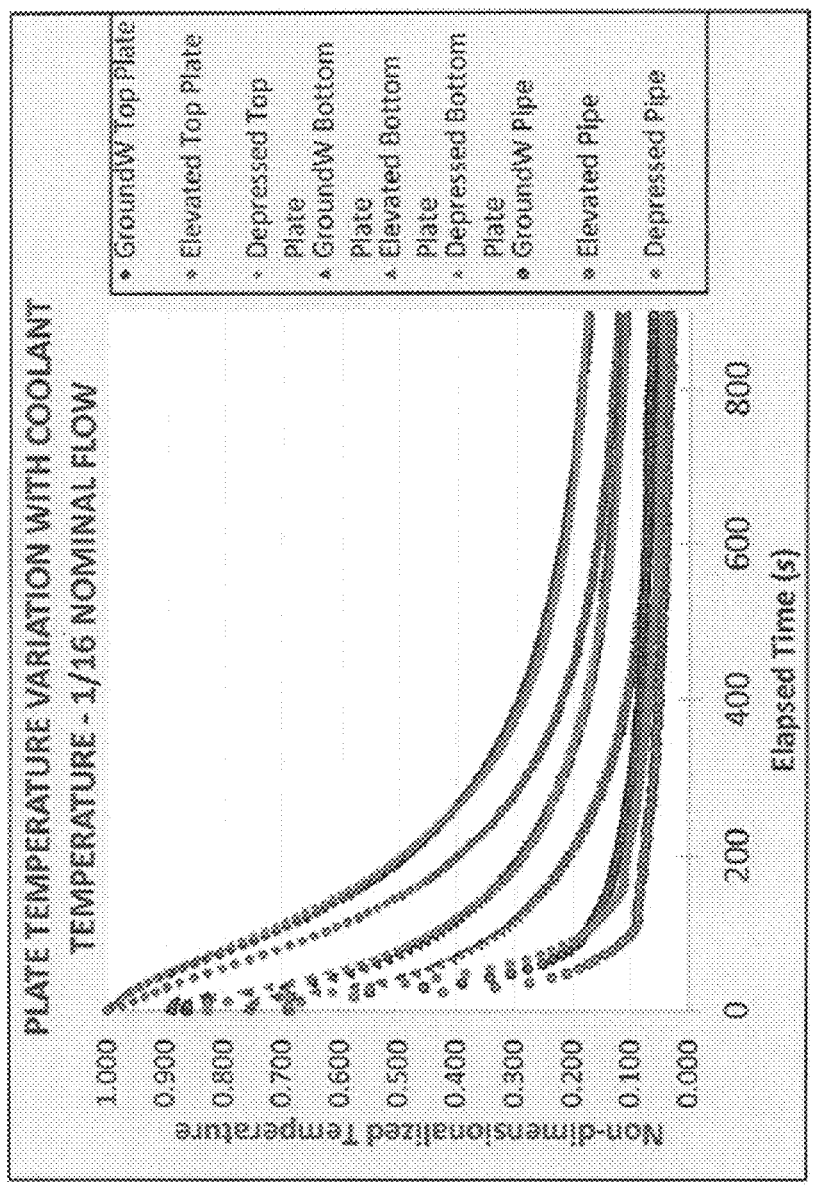

The effect of the coolant temperature was studied using an elevated and a depressed temperature fluid (heated and chilled water, respectively) compared to the nominal temperature fluid (ground water). The elevated coolant supply was at a temperature of about 27° C., and the depressed coolant was at a temperature of about 11° C. FIGS. 17 and 18 show the effect of coolant temperature on the temperature traces within the device at "⅛ nominal flow" (about 1.9 l/min) and "1/16 nominal flow" (about 1.0 l/min). The family of temperature curves shows an as-expected consistency for the higher flow rate, with warmer coolant flows demonstrating a faster temperature decline toward the less extreme coolant potential. The lower flow rate evidences a co-mingling of the nominal temperature fluid and the depressed temperature fluid. This is a significant and potentially advantageous result, since it indicates that the lower flow rates are of more interest within a practical system. There may be other rationales that dictate the use of a chilled coolant within the cooling pad 12, but these investigations indicate that there is no significant advantage in the relative thermal response at the higher flow rates.

The uniformity of the temperatures across the upper surface 21 was examined through the use of IR photography. A full series of photos of the upper surface 21 of the pad body 20 were taken throughout the testing, and there was no significant variation of the temperature across the upper surface 21.

An examination was performed to study a time to draw-out the energy of the cooling pad 12 when held in a thermal potential above that of the ambient environmental temperature (flush time), as well as the time required to reduce the pad body 20 to a temperature below the ambient environment temperature. Those results are included in Table 6. Based upon the temperature of the pad body 20 at the beginning of the experimental runs and its construction materials, a 200 kJ energy level was set as the energy potential above the ambient condition. Flushed energy was calculated using the coolant flow rate and the temperature differential across the sensors located at the inlet 15 and outlet 17. Interestingly, it took slightly longer to remove 200 kJ at the full flow rate than at two-thirds of the full flow rate. This probably indicates that the coolant at full flow had not reached a fully developed thermal profile within the cooling pad 12, due to the flow velocity through the cooling element 23. Otherwise, it generally took progressively longer to remove a set amount of energy at with decreasing flow rates.

TABLE 6

Cooling times.

| Condition (relative to nominal flow) | Flush Time (s) | Pad Body Below Ambient Temperature (s) |
|---|---|---|
| Full Flow | 138 | 240 |
| ⅔ Flow | 114 | 276 |
| ¼ Flow | 720 | 330 |
| ⅛ Flow | 870 | 348 |
| 1/16 Flow | 1188 | 372 |

The third column in Table 6 represents when active cooling occurs under the various flow conditions. As used herein, the term active cooling means that the temperature of the upper surface 21 of the cooling pad 12 drops below the ambient environmental temperature. The values in Table 6 show a uniform progressive increase in time with reduced coolant flows. This clearly indicates that the design of the cooling pad 12 with enhanced conductive heat transfer paths to the upper surface 21 and insulated paths to the surrounding environment was very effective at rapidly transferring heat through the upper surface 21. In fact, the investigations indicated that the cooling pad 12 is capable of removing heat from an animal, even before the system has fully equilibrated, that is, before the upper surface 21 fully cools to its full extent based on the flow rate of coolant.

Since there was significant heat held within the insulating material 26, it was estimated that approximately an hour of operation would be required to reach a true steady-state condition with the coolant in the cooling pad 12 used in the investigations. This indicates that utilizing a stand-alone device, such as the cooling pad 12, for animal cooling is likely significantly more efficient and responsive than a system that includes cooling elements embedded within the construction of a building, for example, an in-floor cooling system. In addition to wasting significant energy and effort, the capacitance associated with additionally cooling the floor would likely make the responsiveness of an embedded cooling system unacceptably long and unwieldy. Specifically, active cooling embedded into a floor would likely have a very large time constant, due to the thermal capacitance of the floor and portions of the building thermally communicating with the floor, creating a slow, non-responsive overall system.

Four different methods of attaching the intermediate member 24 to the pad body 20 were studied including welding, soldering, adhesive, and fasteners. Welding was determined to provide the highest rate of reducing the temperature of the cooling pad 12, followed by the use of fasteners. The adhesive provided the lowest rate of cooling and it was believed that the adhesive was behaving as a heat transfer barrier between the pad body 20 and the intermediate member 24. Therefore, fastening was concluded to be a preferred method of construction for its fast cooling rate, ease of manufacture, and flush contact between the layers.

Based on the results of the above-noted investigations, the time constants for the cooling pad 12 under convective cooling were relatively invariant and increased significantly under the no-flow (free convective cooling) mode. The upper surface 21 exhibited relative uniformity in surface temperature, with no hot or cold spots evident under thermal photography. The overall structural design of the cooling pad 12 with enhanced and insulated heat transfer paths appeared to be effective, as the data indicated that the cooling pad 12 is capable of providing active cooling to an animal even before it has finished removing its own stored energy.

In view of the above, this disclosure provides a method of cooling an animal relative to an ambient environmental temperature with the system 10. In particular, the cooling pad 12 may be located in a farrowing crate or other area intended to contain the animal. The animal may then be placed in the area such that the animal is located at least partially on the upper surface 20 of the pad body 20. Flow of a coolant through the internal passage of the cooling element 23 may then be initiated such that the temperature of the upper surface 20 and consequently the body temperature of the animal is reduced. During use, various sensors within the system 10 of a data acquisition device may provide data to an operator or the control unit 18. The flow rate of the coolant may be in response to a change in a temperature of the pad body 20, the temperature or relative humidity of air in proximity of the cooling pad 12, input and output temperatures of the coolant from the cooling element 23, the flow rate of the coolant within the cooling element 23, the respiratory rate of the animal, or any other sensed or determined parameters.

The systems and methods disclosed herein provide means for efficiently and effectively addressing inconsistent agricultural conditions arising from modern hog farrowing operations that seek to maintain higher ambient environmental conditions for piglets that can be detrimental to the reproductive performance and well-being of the sow. The cooling pad 12 provides a uniformly cooled upper surface 21 on which a sow may rest while remaining relatively close to and within the same ambient environment as the piglets. In other applications, the animals may have more freedom of movement. Therefore, the cooling pad 12 can be positioned to provide an animal relief from thermal stress due to the environmental conditions at the animal's discretion. For example, the cooling pad 12 may be located in a corner of a pen and the animal may lay on the cooling pad 12 or not at its discretion.

While the invention has been described in terms of specific or particular embodiments and investigations, it should be apparent that alternatives could be adopted by one skilled in the art. For example, the cooling pad 12 and its components could differ in appearance and construction from the embodiments described herein and shown in the drawings, functions of certain components of the cooling pad 12 could be performed by components of different construction but capable of a similar (though not necessarily equivalent) function, and various materials could be used in the fabrication of the cooling pad 12 and/or its components. In addition, the invention encompasses additional or alternative embodiments in which one or more features or aspects of the disclosed embodiment could be eliminated or modified. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A system for cooling an animal, the system comprising:
   a cooling pad (12) comprising:
   a rigid metallic panel having an upper surface for contacting the animal and a lower surface;
   at least one cooling element having an internal passage therein through which a coolant flows and having an inlet and an outlet located on at least one side of the cooling pad through which the coolant enters and exits, respectively, the cooling pad; and
   an intermediate member thermally contacting the lower surface of the metallic panel and comprising means for retaining the cooling element in physical contact with the intermediate member to maintain thermal contact between the cooling element and the metallic panel; and
   a control unit that controls the temperature of the metallic panel by monitoring the temperature of the metallic panel and adjusting a parameter of the coolant flowing through the internal passage of the cooling element;
   wherein flow of the coolant through the cooling element reduces the temperature of the upper surface of the metallic panel and thereby reduces the body temperature of the animal when the animal is in contact with the metallic panel.

2. The system of claim 1, wherein the retaining means comprises an array of C-shaped channels.

3. The system of claim 1, further comprising an insulating material configured to reduce a rate of heat transfer between the cooling element and the surrounding environment other than the metallic panel.

4. The system of claim 3, wherein the insulating material is located on lateral sides of or below the cooling element.

5. The system of claim 1, wherein the parameter of the coolant is the flow rate of the coolant through the internal passage of the cooling element.

6. The system of claim 1, wherein the control unit monitors the temperatures of the coolant flowing into and out of the internal passage of the cooling element.

7. The system of claim 1, wherein the control unit adjusts the flow rate of the coolant in response to a change in a temperature or a relative humidity of air in the proximity of the metallic panel, or a change in input and output temperatures of the coolant from the cooling element and the flow rate of the coolant within the cooling element.

8. The system of claim 1, wherein the control unit adjusts the flow rate of the coolant in response to a change in a physiological parameter of the animal.

9. The system of claim 1, wherein the control unit adjusts the flow rate of the coolant based on a numerical model based upon historical data factors for the animal or a herd that the animal belongs to.

10. The system of claim 1, further comprising means for monitoring and collecting data relating to thermal characteristics of the metallic panel and storing collected data on a database.

\* \* \* \* \*